(12) United States Patent
Maeda

(10) Patent No.: US 7,208,745 B2
(45) Date of Patent: Apr. 24, 2007

(54) RADIATION IMAGE CONVERSION PANEL

(75) Inventor: Keiko Maeda, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/498,696

(22) Filed: Aug. 3, 2006

(65) Prior Publication Data

US 2007/0040129 A1 Feb. 22, 2007

(30) Foreign Application Priority Data

Aug. 18, 2005 (JP) .............................. 2005-237127
Feb. 28, 2006 (JP) .............................. 2006-052096

(51) Int. Cl.
*G03B 42/08* (2006.01)

(52) U.S. Cl. .................................................. 250/484.4

(58) Field of Classification Search .............. 250/484.4
See application file for complete search history.

(56) References Cited

U.S. PATENT DOCUMENTS

| 5,549,844 | A | * | 8/1996 | Bringley et al. | ..... | 252/301.4 H |
| 5,646,412 | A | * | 7/1997 | Bryan et al. | ............. | 250/483.1 |
| 6,706,211 | B2 | * | 3/2004 | Matsumoto | ........... | 252/301.4 H |

* cited by examiner

*Primary Examiner*—Constantine Hannaher
*Assistant Examiner*—Mark R. Gaworecki
(74) *Attorney, Agent, or Firm*—Frishauf, Holtz, Goodman & Chick, P.C.

(57) ABSTRACT

An object of the present invention is to provide a radiation image conversion panel exhibiting excellent sharpness, excellent graininess and high luminance, accompanied with high aging performance. Also disclosed is a radiation image conversion panel possessing an alkali metal halide based stimulable phosphor layer formed by a vapor deposition method, provided on a support, wherein a stimulable phosphor possesses at least two kinds of halides, and a phosphor columnar crystal in the stimulable phosphor layer has a core/shell structure.

7 Claims, 2 Drawing Sheets

RADIATION IMAGE CONVERSION PANEL

This application claims priority from Japanese Patent Application No. 2005-237127 filed on Aug. 18, 2005 and Japanese Patent Application No. 2006-052096 filed on Feb. 28, 2006, which are incorporated hereinto by reference.

TECHNICAL FIELD

The present invention relates to a radiation image conversion panel used for medical use.

BACKGROUND

It is usually said that moisture absorption of a radiation image conversion panel tends to occur easily, when a phosphor in the radiation image conversion panel formed by a vapor deposition method (hereinafter, referred to also as an evaporation type radiation image conversion panel) is not covered by binder and the like. In order to improve this, intensive studies have been made, in which moisture permeability of protective layers is lowered by reducing initial moisture as much as possible via heating of the phosphor, or moisture absorption is reduced as much as possible by providing an inert gas layer between the protective layer and the phosphor layer, but not much effect has been obtained (refer to Patent Documents 1 and 2, for example). Further, though the evaporation type radiation image conversion panel exhibits good properties such as sharpness and graininess in comparison to a coating type stimulable phosphor panel, further improved performance of these properties has been demanded.

(Patent Document 1) Japanese Patent O.P.I. Publication No. 2004-266876

(Patent Document 1) Japanese Patent O.P.I. Publication No. 2002-131496

SUMMARY

It is an object of the present invention to provide a radiation image conversion panel exhibiting excellent sharpness, excellent graininess and high luminance, accompanied with high aging performance. Disclosed is a radiation image conversion panel possessing an alkali metal halide based stimulable phosphor layer formed by a vapor deposition method, provided on a support, wherein a stimulable phosphor possesses at least two kinds of halides, and a phosphor columnar crystal in the stimulable phosphor layer has a core/shell structure.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DESCRIPTION OF THE PREFERRED EMBODIMENTS

The above object of the present invention is accomplished by the following structures.

(Structure 1) A radiation image conversion panel possessing an alkali metal halide based stimulable phosphor layer formed by a vapor deposition method, provided on a support, wherein a stimulable phosphor possesses at least two kinds of halides, and a phosphor columnar crystal in the stimulable phosphor layer has a core/shell structure.

(Structure 2) The radiation image conversion panel of Structure 1, wherein a composition ratio of alkali metal halides A to B is in A>B, and a core portion of the phosphor columnar crystal is made of alkali metal halide A and a halogen composition ratio of A to B constituting a shell portion of the phosphor columnar crystal is 95:5–0: 100, when the stimulable phosphor possessing alkali metal halide A as a main component and alkali metal halide B as another component.

(Structure 3) The radiation image conversion panel of Structure 1 or 2, wherein the alkali metal halide based stimulable phosphor layer has a thickness of 50–500 μm.

(Structure 4) The radiation image conversion panel of any one of Structures 1–3, wherein the core portion of the phosphor columnar crystal is made of CsBr:Eu (cesium bromide:europium activator), and the shell portion of the phosphor columnar crystal is made of CsF:Eu (cesium fluoride:europium activator) and CsBr:Eu (cesium bromide: europium activator).

(Structure 5) The radiation image conversion panel of any one of Structures 1–3, wherein the core portion of the phosphor columnar crystal is made of CsBr:Eu (cesium bromide: europium activator), and the shell portion of the phosphor columnar crystal is made of CsCl:Eu (cesium chloride: europium activator) and CsBr:Eu (cesium bromide:europium activator).

(Structure 6) The radiation image conversion panel of any one of Structures 1–3, wherein the core portion of the phosphor columnar crystal is made of CsBr:Eu (cesium bromide: europium activator), and the shell portion of the phosphor columnar crystal is made of CsI:Eu (cesium iodine:europium activator) and CsBr:Eu (cesium bromide: europium activator).

(Structure 7) The radiation image conversion panel of any one of Structures 1–6, wherein a moisture content of the stimulable phosphor layer, after letting the radiation image conversion panel possessing the alkali metal halide based stimulable phosphor layer formed on a support by the vapor deposition method stand at 23° C. and 80% RH for 6 hours, is 1–50 ppm.

While the preferred embodiments of the present invention have been described using specific terms, such description is for illustrative purposes only, and it is to be understood that changes and variations may be made without departing from the spirit or scope of the appended claims.

DETAILED DESCRIPTION OF THE INVENTION

Next, the present invention will be explained in detail.

Figure 1:
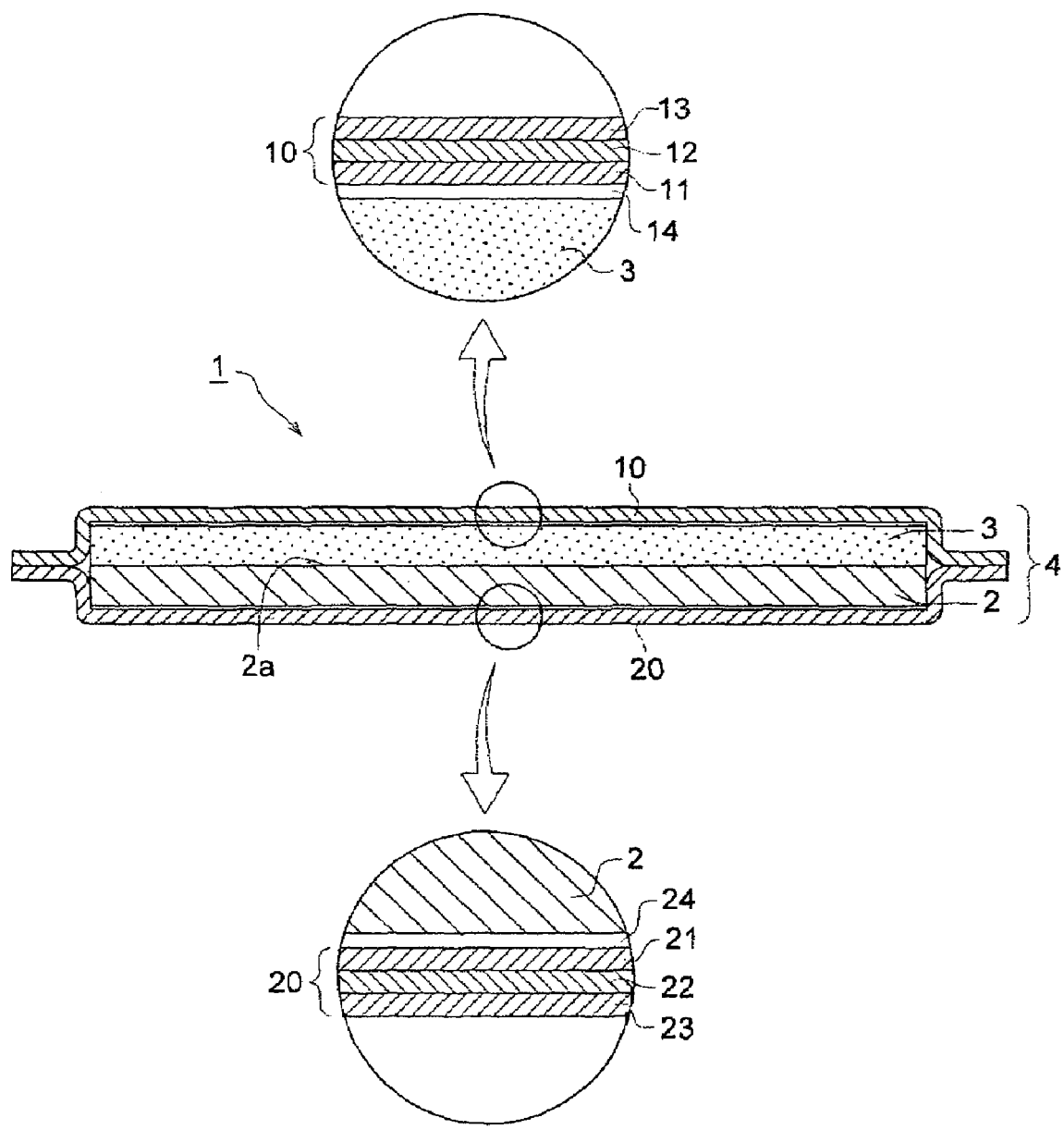
FIG. 1 is a cross-sectional view showing a radiation image conversion panel.

FIG. 1 is a cross-sectional view showing radiation image conversion panel 1.

As shown in FIG. 1, radiation image conversion panel 1 possesses stimulable phosphor plate (simply referred to also as a phosphor plate) 4 in which stimulable phosphor layer 3 is formed on given support 2.

Support 2 is composed of polymeric materials, glass or metals, and preferable examples of those specifically include a plastic film such as a cellulose acetate film, a polyester film, a polyethylene terephthalate film, a polyamide film, a polyimide film, a triacetate film or a polycarbonate film; plate glass such as quartz, borosilicate glass, chemically or tempered glass; or a metal sheet such as a aluminum sheet, an iron sheet, a copper sheet or a chromium sheet, or a metal sheet covered with its metal oxide layer.

Surface 2a of support 2 (drawing at the upper portion of FIG. 1) may be smooth-surfaced or matted. Surface 2a of support 2 may be matted in order to enhance adhesion to stimulable phosphor layer 3, or a subbing layer may be provided on surface 2a in order to enhance adhesion to stimulable phosphor layer 3. Further, a light reflection layer may also be provided on surface 2a in order to prevent stimulating light from entering stimulable phosphor layer 3 after penetrating support 2.

Stimulable phosphor 3 is composed of a layer structure having at least one layer, and the layer thickness is preferably 50–500 μm. Stimulable phosphor 3 is also composed of a columnar structure in which a number of columnar crystals made of a stimulable phosphor are spaced out with each other.

It is a feature in the present invention that phosphor columnar crystals in foregoing stimulable phosphor 3 have a core/shell structure.

The core/shell structure means that the surface composition of a columnar crystal is different from the internal composition of that.

Regarding the surface composition, a composition of the surface as well as the side surface of columnar crystals can be determined employing an XPS, and the internal composition can also be determined employing an XPS by etching the surface as well as the side surface of columnar crystals with Ar ions. The composition of the internal columnar structure at a depth of 50 nm–1 μm can be obtained via measurement of an etching rate by etching a sample having a known thickness with Ar ions in this case. When a halogen composition difference between the surface and the interior is at least 5%, the structure is referred to as a core/shell structure.

As an apparatus, ESCALab200R produced by Thermo VG Scientific is provided, but the apparatus is not limited thereto.

It is also preferred in the present invention that a composition ratio of alkali metal halides A to B is in A>B, and a core portion of the phosphor columnar crystal is made of alkali metal halide A and a halogen composition ratio of A to B constituting a shell portion of the phosphor columnar crystal is 95:5–0:100, when the stimulable phosphor possessing alkali metal halide A as a main component and alkali metal halide B as another component.

The total halogen composition means the halogen composition in the total phosphor. In order to determine a halogen composition, the halogen composition can be obtained via ion chromatography analysis after dissolving a phosphor in water. Even though the difference of contents of alkali metal halides A to B is large, the halogen composition can be determined by employing optimal measurement conditions.

A stimulable phosphor panel is generally deteriorated over time because of moisture absorption, but since each of columnar crystals is independently placed even in moisture absorption, the degradation of properties caused by adhesion to each other is possible to be prevented by forming a core/shell structure in columnar crystals. Further, moisture absorption itself is also possible to be reduced by providing a moisture absorption resistant material in a shell portion.

It is preferable that the surface of columnar crystals in a stimulable phosphor formed by a vapor deposition method is treated to form columnar crystals having a core/shell structure. On the contrary, a core/shell structure can not be formed even though vapor deposition is conducted employing different kinds of admixture materials. A core/shell structure can not be formed even though a different kind of material is deposited again after forming a stimulable phosphor, resulting simply in another layer provided on the layer configuration.

In order to form a shell, a method via halogen substitution is preferred. Not only a direct substitution method by introducing a halogen gas may be used, but also a substitution method by releasing halogen from a halogen release agent via heating may be used.

The halogen gas is a HF gas, a HCl gas, a HBr gas or a HI gas, and a special vessel is desired since these gases are corrosive. Any material capable of releasing halogen via heating is usable as the halogen release agent.

Exemplified is, for example, a compound in which at least one hydrogen atom in a hydrocarbon compound is substituted by fluorine atoms, chlorine atoms, bromine atoms and iodine atoms belonging to the halogen family of elements. The halogen release agent may be: a compound in which each element-to-element bond is only of the structure of a saturated bond, a compound containing an unsaturated bond, a compound having an unsaturated bond, a cyclic compound, a chained compound or a compound in which atoms or molecules in a compound are substituted by a hydroxyl group, an ether group, a carbonyl group or a carboxyl group.

In the present invention, preferable compounds as the halogen release agent are shown below.

Known fluorocarbon alternatives are useful from the aspect of environmental concerns as the specific fluorine release agent. HFE (hydrofluoroether) as a new fluorocarbon alternative, can suitably be used as the halogen release agent.

HFE is composed of carbon, fluorine, hydrogen and one ether oxygen atom or more, and one heteroatom or more incorporated in the main carbon chain such as sulfur or trivalent nitrogen atom may be contained. HFE may be straight, branched, cyclic or a mixture of those which is, for example, alkyl cycloaliphatic. In addition, it is preferable that an unsaturated bond is not contained in HFE.

Compounds represented by the following formula (A) are usable for HFE.

Formula (A)

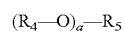

$(R_4—O)_a—R_5$ where a in above Formula (A) is an integer of 1–3; $R_4$ and $R_5$ are selected from the group including alkyl and aryl, and are identical or different with each other. At least one of $R_4$ and $R_5$ contains at least one fluorine atom and at least one hydrogen atom, either one of $R_4$ and $R_5$ or both of $R_4$ and $R_5$ may contain one hetero atom or more in the chain, and the total number of fluorine atoms in HFE is preferably more than the total number of hydrogen atoms. $R_4$ and $R_5$ may be straight, branched or cyclic, and both $R_4$ and $R_5$ are in a saturation-bonding atom group with each other, though at least one unsaturated carbon—carbon bond may be contained.

HFE exhibiting such a property includes NOVEC™ HFE-7100, HFE-7100DL and HFE-7200 produced by Sumitomo 3M, Ltd, and HFE S7 (product name) produced by Daikin Industries, Ltd. Those HFE products available on the market can be used as halogen release agents which are usable for a heating process.

Specific examples of chloride release agents include hypochlorite, chlorite, N-chlorophthalimide, N-dichloro-p-toluenesulfonamide, 2,5-N,N'-dichloro-azodicarvone amidine-hydrochloride, N,N'-dichloro-dimethyl-hydantoin, N-bromo-N'-chloro-dimethyl-hydantoin, N-bromo-N-chloro-diphenyl-hydantoin, N,N, N,N-tetrachloro-dimethyl-glycol ureasil, N-bromo-N,N-dichloro-dimethyl-glycol ureasil, N,N, N,N-tetrachloro-glycol ureasil, N,N-dichloro-dichloroyl, N-bromo-N-chloro-sodiumcyanurate, dibromotriethylenediaminedihydrochloride, bromo-chloro-triethylenediaminediaminedihydrochloride and N,N, N-tri chloro-melamine.

Specific examples of iodine release agents include various iodine clathrate compounds typified by povidone-iodine in which iodine is included by a polymer compound, iodine itself and so forth. A cyclodextrin-iodine clathrate compound and the like are also usable. This may be produced by a commonly known method, and be a commercially available product. The method of preparing the cyclodextrin-iodine clathrate compound has been described in Japanese Patent O.P.I. Publication 2002-193719. BCDI, BCDITR, MCTCDI, MCDI and so forth (produced by Nippoh Chemicals Co., Ltd.) can be provided as commercially available products, but the present invention is not limited thereto. It is preferred that the cyclodextrin-iodine clathrate compound is in the form of powder.

Figure 2:
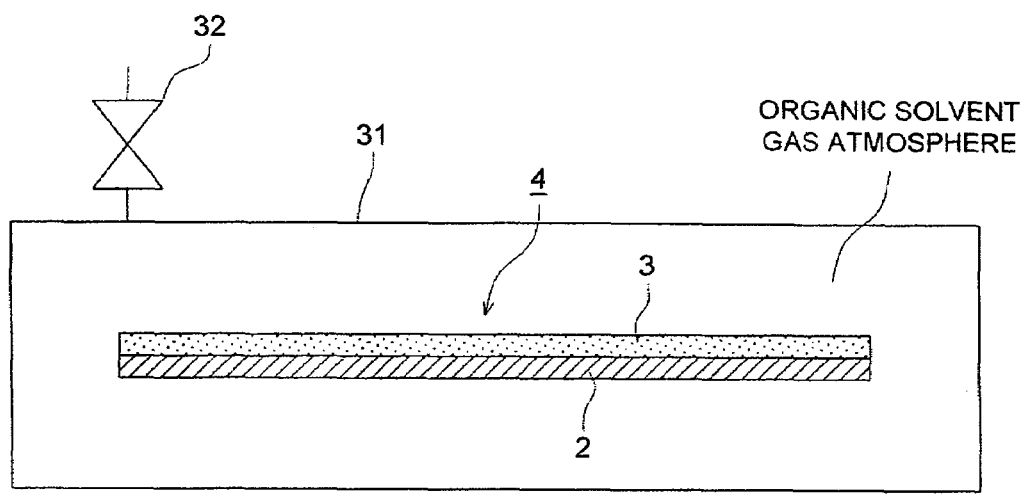
FIG. 2 is a schematic diagram showing an example of an apparatus for forming a shell by using a halogen release agent or halogen.

FIG. 2 is a schematic diagram showing an example of an apparatus for forming a shell by using a halogen release agent or halogen.

Specifically, stimulable phosphor plate 4 is placed in the interior of thermostatic oven 31, and the interior of thermostatic oven 31 is set to a vacuum degree of about 0.1 Pa to subsequently introduce a halogen release agent or halogen with valve 32 closed, heat at 140–160° C., and increase a pressure at 0.15 MPa. Halogen on the phosphor surface can be replaced spending 0.5–4 hours.

It is preferable in view of enhanced effects of the present invention that a core portion of the foregoing phosphor columnar crystal is made of CsBr:Eu (cesium bromide europium activator), and a shell portion of the foregoing phosphor columnar crystal is made of CsF:Eu (cesium fluoride europium activator) and CsBr:Eu (cesium bromide: europium activator), CsCl:Eu (cesium chloride:europium activator) and CsBr:Eu (cesium bromide:europium activator), or CsI:Eu (cesium iodine:europium activator) and CsBr:Eu (cesium bromide:europium activator).

It is further preferable in view of enhanced effects of the present invention that a moisture content of a stimulable phosphor layer containing at least two kinds of halides, after letting a radiation image conversion panel possessing the alkali metal halide based stimulable phosphor layer formed on a support by a vapor deposition method stand at 23° C. and 80% RH for 6 hours, is 1–50 ppm, and the phosphor columnar crystal in the stimulable phosphor layer has a core/shell structure.

Herein, a stimulable phosphor constituting stimulable phosphor layer 3 will be described in detail.

A stimulable phosphor represented by following formula (1) is usable.

Formula (1)

$$M_1 X \cdot aM_2 X'_2 \cdot bM_3 X''_3 : eA$$

wherein $M_1$ is at least one alkali metal atom selected from Li, Na, K, Rb and Cs, and preferably at least one alkali metal atom selected from K, Rb and Cs.

$M_2$ is at least one divalent metal atom selected from Be, Mg, Ca, Sr, Ba, Zn, Cd. Cu and Ni, and preferably at least one divalent metal atom selected from Be, Mg, Ca, Sr and Ba.

$M_3$ is at least one trivalent metal atom selected from Sc, Y, La, Ce, Pr, Nd, Pm, Sm, Eu, Gd, Tb, Dy, Ho, Er, Tm, Yb, Lu, Al, Ga and In, and preferably at least one trivalent metal atom selected from Y, La, Ce, Sm, Eu, Gd, Lu, Al, Ga and In.

X, X' and X" each are at least one halogen atom selected from F, Cl, Br and I, and particularly, X is preferably at least one halogen atom selected from Br and I.

A in Formula (1) is at least one metal atom selected from Eu, Tb, In, Ga, Cs, Ce, Tm, Dy, Pr, Ho, Nd, Yb, Er, Gd, Lu, Sm, Y, Tl, Na, Ag, Cu and Mg, and preferably at least one metal atom selected from Eu, Cs, Sm, Tl and Na.

The a, b and e each are in the numerical ranges of $0 \leq a < 0.5$, $0 \leq b < 0.5$, and $0 < e \leq 0.2$, and particularly, b is preferably in the numerical range of $0 \leq b \leq 10^{-2}$ Of these, a stimulable phosphor represented by following Formula (2) is specifically preferable.

Formula (2)

$$CsX:zA$$

wherein X represents F, Cl, Br or I, and A in Formula (2) represents Eu, In, Ga or Ce. When Eu is particularly used as an activator, X-ray conversion efficiency is expected to be improved.

The above-described stimulable phosphor is manufactured employing phosphor materials exemplified in the following (a)–(d) by a manufacturing method described below.

(a) One compound or at least two compounds selected from LiF, LiCl, LiBr, LiI, NaF, NaCl, NaBr, NaI, KF, KCl, KBr, KI, RbF, RbCl, RbBr, RbI, CsF, CsCl, CsBr and CsI.

(b) One compound or at least two compounds selected from $BeF_2$, $BeCl_2$, $BeBr_2$, $BeI_2$, $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaI_2$, $ZnF_2$, $ZnCl_2$, $ZnBr_2$, $ZnI_2$, $CdF_2$, $CdCl_2$, $CdBr_2$, $CdI_2$, $CUF_2$, $CuCl_2$, $CuBr_2$, $CuI_2$, $NiF_2$, $NiCl_2$, $NiBr_2$ and $NiI_2$.

(C) One compound or at least two compounds selected from $ScF_3$, $ScCl_3$, $ScBr_3$, $ScI_3$, $YF_3$, $YCl_3$, $YBr_3$, $YI_3$, $LaF_3$, $LaCl_3$, $LaBr_3$, $LaI_3$, $CeF_3$, $CeCl_3$, $CeBr_3$, $CeI_3$, $PrF_3$, $PrCl_3$, $PrBr_3$, $PrI_3$, $NdF_3$, $NdCl_3$, $NdBr_3$, $NdI_3$, $PmF_3$, $PmCl_3$, $PmBr_3$, $PmI_3$, $SmF_3$, $SmC_{13}$, $SmBr_3$, $SmI_3$, $EuF_3$, $EuCl_3$, $EuBr_3$, $EuI_3$, $GdF_3$, $GdCl_3$, $GdBr_3$, $GdI_3$, $TbF_3$, $TbCl_3$, $TbBr_3$, $TbI_3$, $DyF_3$, $DyCl_3$, $DyBr_3$, $DyI_3$, $HoF_3$, $HoCl_3$, $HoBr_3$, $HoI_3$, $ErF_3$, $ErCl_3$, $ErBr_3$, $ErI_3$, $TmF_3$, $TmC_{13}$, $TmBr_3$, $TmI_3$, $YbF_3$, $YbCl_3$, $YbBr_3$, $YbI_3$, $LuF_3$, $LuC_{13}$, $LuBr_3$, $LuI_3$, $AlF_3$, $AlCl_3$, $AlBr_3$, $AlI_3$, $GaF_3$, $GaCl_3$, $GaBr_3$, $GaI_3$, $InF_3$, $InCl_3$, $InBr_3$ and $InI_3$.

(d) One metal atom or at least two metal atoms selected from Eu, Tb, In, Ga, Cs, Ce, Tm, Dy, Pr, Ho, Nd, Yb, Er, Gd, Lu, Sm, Y, Tl, Na, Ag, Cu and Mg.

Phosphor materials, selected from the foregoing (a)–(d) so as to satisfy the numerical range of a, b and c represented by Formula (1), are weighed and mixed in pure water. In this regard, there may be conducted sufficient mixing using a mortar, ball mill or mixer mill.

Next, a prescribed amount of an acid is added to adjust a pH value of C in the thus solution obtained so as to fall within the range of $0<C<7$, and then moisture is vaporized.

Further, the raw material mixture obtained is charged into a heat-resistant vessel such as a silica port, an alumina crucible or a silica crucible and then placed in an electric furnace to be calcined. The calcination temperature is preferably 500–1000° C. The calcination time, depending on a charging amount of raw material, calcination temperature and the like, is preferably 0.5–6 hrs.

As a calcination atmosphere is employed a weakly reducible atmosphere such as a nitrogen gas atmosphere containing a small amount of hydrogen gas or a carbon dioxide atmosphere containing a small amount of carbon monoxide, a nitrogen gas atmosphere, a neutral atmosphere such as an inert gas atmosphere, or a trace amount of oxygen-introduced weakly oxidizing atmosphere.

After completion of calcination under the foregoing condition, calcined material is taken out of the electric furnace and subjected to pulverization. Thereafter, powdery calcined material may again be charged into a heat resistant vessel and then placed in an electric furnace to be calcined under the foregoing condition to further enhance emission luminance of the stimulable phosphor. When the calcined material is allowed to cool from calcination temperature to room temperature, the intended phosphor can also be obtained when it is taken out of an electric furnace and is allowed to stand in an aerial atmosphere. In this regard, the calcined material may be cooled in the same atmosphere as in the calcination, such as a weakly reducing atmosphere, neutral atmosphere or a weakly oxidizing atmosphere.

Emission luminance of the obtained stimulable phosphor can be further enhanced by moving calcined material from a heating area to a cooling area in an electric furnace and then quenching it in a weakly reducing atmosphere, neutral atmosphere or a weakly oxidizing atmosphere.

In the present invention, stimulable phosphor layer 3 can be formed in a desired thickness by columnar-crystallizing the above stimulable phosphor onto one surface of support 2 by a vapor deposition method.

Any method such as a vacuum evaporation method (referred to also as an evaporation method), a sputter deposition method, a CVD method, an ion plating method, and so forth can be employed as a vapor deposition method, but particularly, an evaporation method is preferably usable.

Concerning a usable evaporation method, an evaporator as shown in FIG. 2, for example, is preferably usable.

Figure 3:
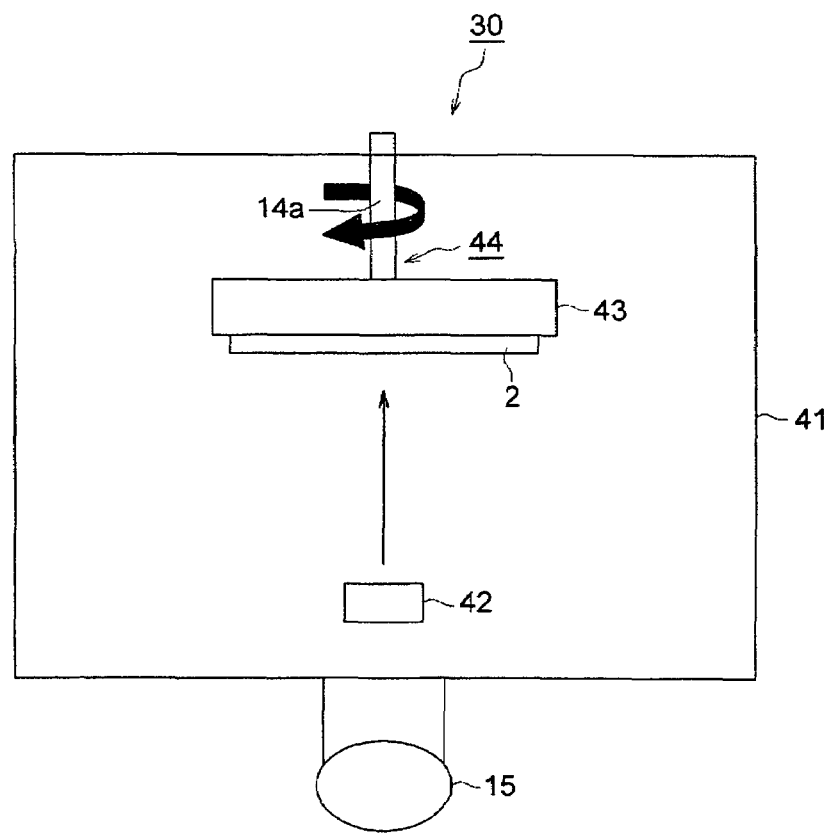
FIG. 3 is a cross-sectional view showing a schematic configuration of an example of the evaporator.

As shown in FIG. 3, evaporator 30 is equipped with vacuum chamber 41, evaporation source 42 installed in vacuum chamber 42 to evaporate or sublimate a stimulable phosphor via heating, evaporating vapor onto support 2, support holder 43 holding support 2, support rotation mechanism 14a rotatable support holder 43 with respect to evaporation source 42, and vacuum pump 15 performing evacuation and introduction of the atmosphere inside vacuum chamber 41. Stimulable phosphor layer 3 of the present invention can be formed by evaporating a vapor from evaporation source 42 onto support 2 while rotatable support holder 43 controlled by support rotation mechanism 14a in evaporator 30.

Evaporation source 42 may be constituted of an alumina crucible wounded with a heater to contain and heat a stimulable fluorescent substance by means of a resistance heating method, of a boat, or of a heater comprising a high melting point metal. Further, a method to heat a stimulable fluorescent substance may be one by means of electron beam or high frequency induction other than a resistance heating method, however, in this invention, preferable is a resistance heating method with respect to a relatively simple constitution and easy handling, being low-priced as well as applicability to great many substances. Further, evaporation source 42 may be a molecular beam source by means of a molecular source epitaxial method.

An inert gas such as Ar or He is preferably employed to control a vacuum degree (not shown in the drawing).

Further, a shutter (not shown in the drawing), which shut the space being spread from evaporation source to support 2, may be equipped between support 2 and evaporation source 42. The shutter can prevent substances other than the object substances, which are adhered on the surface of a stimulable phosphor, from being adhered on support 2 at the initial stage of evaporation.

It is preferred that support holder 43 is equipped with a heater (not shown in the drawing) to heat support 2. Absorbed substances on the surface of support 2 can be released and eliminated by heating support 2, and generation of an impurity layer between support 2 and a stimulable phosphor can be avoided, whereby enhancement of adhesion as well as layer quality adjustment of a stimulable phosphor layer can be performed.

Support rotation mechanism 14a is constituted of support rotation axis 44 which supports support holder 43, and rotates support holder 43, and a motor (not shown in the drawing) which is placed outside vacuum chamber 41 and works as a driving source of support rotation axis 14.

Stimulable phosphor layer 3 can be formed on support 2 with the following procedures employing evaporator 30 as described above.

Support 2 is initially attached to support holder 4.

Next, the inside of vacuum chamber 41 is evacuated to adjust so as to have a desired vacuum degree. Then, support holder 43 is rotated with respect to evaporation source 42 by support rotation mechanism 14a, and a stimulable phosphor is evaporated from heated evaporation source 42 when vacuum chamber 41 reaches a vacuum degree at which evaporation is ready to be conducted, to grow the stimulable phosphor on the surface of support 2 up to a desired thickness. In this case, the distance between support 2 and evaporation source 42 is preferably arranged at 100–1500 mm.

In addition, in the foregoing evaporation process divided into plural times, a stimulable phosphor is also possible to be formed. Further, it is also possible to form stimulable phosphor layer 3 simultaneously with synthesizing a desired stimulable phosphor on support 2 via co-evaporation in the foregoing evaporation process employing plural resistance heaters or electron beam.

Further, in an evaporation method, an object to be evaporated (support 2, a protective layer or an intermediate layer) may be cooled or heated at the time of evaporation, if desired.

In addition to this, after finishing evaporation, stimulable phosphor layer 3 may be heat-treated. Further, in an evaporation method, a reactive evaporation may be performed by introducing a gas such as $O_2$ or $H_2$, if desired.

As for formation of stimulable phosphor layer 3 by the above vapor deposition method, a temperature to form a stimulable phosphor layer is preferably set to room temperature (rt)—300° C. and more preferably set to 50–200° C. Vacuum degree P is preferably in the range of $1.0\times10^{-5}<P<5.0\times10^{-1}$ Pa, and more preferably in the range of $3.0\times10^{-3}<P<3.0\times10^{-1}$ Pa.

As described above, stimulable phosphor layer 3 is made of a stimulable phosphor, and phosphor plate 4 is composed of stimulable phosphor layer 3 and support 2.

In radiation image conversion panel 1, protective layers are provided to protect phosphor plate 4. Two moisture resistance protective films 10 and 20 are provided as the protective layer, and phosphor plate 14 lies between first moisture resistance protective film 10 placed on the upper side of stimulable phosphor layer 3 and second moisture resistance protective film 20 placed on the lower side of support 2, as shown in FIG. 1.

First moisture resistance protective film 10 has an area that is slightly greater than phosphor plate 4, and the peripheral portions of first moisture resistance protective film 10 are extended to the outside of peripheral portions of phosphor plate 4, under the condition that first moisture resistance protective film 10 is not adhered to stimulable phosphor layer 3 of phosphor plate 4. The condition under which first moisture resistance protective film 10 is not substantially adhered to stimulable phosphor layer 3 means a state where first moisture resistance protective film 10 is not optically integrated with stimulable phosphor layer 3, and it specifically means the state where the area of contact between first moisture resistance protective film 10 and stimulable phosphor layer 3 is at most 10% of the area of the surface (facing first moisture resistance protective film 10) of stimulable phosphor layer 3.

On the other hand, second moisture resistance protective film 20 also has an area that is slightly greater than phosphor plate 4, and its peripheral portions also extend to the outside of peripheral portions of phosphor plate 4.

In radiation image conversion panel 1, peripheral portions of first moisture resistance protective film 10 and those of second moisture resistance protective film 20 are fused to each other along with the entire circumference, thus, radiation image conversion panel 1 has a structure to seal phosphor plate 4 completely with first and second moisture resistance protective films 10 and 20. The first and second moisture resistance protective films 10 and 20 are made so as to protect the phosphor plate 4 via sealing and absolute prevention of moisture from entering phosphor plate 4.

As shown in the upper portion of an enlarged diagram in FIG. 1, first moisture resistance protective film 10 has a structure in which three layers of first layer 11, second layer 12 and third layers 13 are laminated.

First layer 11 faces stimulable phosphor layer 3 of phosphor plate 4 through air layer 14, and is made of a heat-fusible resin. Examples of the heat fusible resin include ethylene-acetic acid vinylcopolymer (EVA), casting polypropylene (CPP), polyethylene (PE) and so forth.

Second layer 12 is a layer made of metal oxide such as alumina or silica, and evaporated under third layer 13 by a commonly known vacuum evaporation method. Second layer 12 is one for strengthening moisture resistance ability of first moisture resistance protective film 10, but it is not always needed.

Third layer 13 is laminated on second layer 12, and is made of a resin such as polyethyleneterephthalate (PET) and so forth.

First moisture resistance protective film 10 having therein second layer 12 made of metal oxide exhibits excellent processability and transparency, and it is hardly affected by temperature and humidity in view of moisture resistance and oxygen transmission. Therefore, first moisture resistance protective film 10 is suitable for medical use radiation image conversion panel 1 of a stimulable phosphor-using type in which stable image quality with no dependence upon environmental conditions is required.

Incidentally, one layer or at least two layers which is/are the same layer as first layer 11, the same layer as second layer 12 or the same layer as third layer 13, or which is/are made of resin different from that of first layer 11 or third layers 13 may be laminated on third layer 13.

In particular, when a layer identical to second layer 12 made of metal oxide such as alumina or silica is laminated on third layer 13, first moisture resistance protective film 11 displays optimum moisture resistance that is in accordance with the number of laminated layers each corresponding to second layer 12. As a method of lamination for second layer 12 or for a layer equivalent to second layer 12, any method can be applied if it is a commonly known method, but it is preferable in view of workability to employ a method along with a dry lamination system.

As shown in the lower portion of an enlarged diagram in FIG. 1, second moisture resistance protective film 20 has a structure in which three layers of first layer 21, second layer 22 and third layers 23 are laminated.

First layer 21 faces support 2 of phosphor plate 4 via air layer 24. First layer 21 is made of the same resin as in the first layer 11 of first moisture resistance protective film 10, and is fused with first layer 11 of first moisture resistance protective film 10 on its peripheral portion.

Second layer 22 made of aluminum is a layer laminated underneath first layer 21. Second layer 22 is a layer provided for improving moisture resistance of second moisture resistance protective film 20, but it is not always needed.

Third layer 23 made of resin such as PET is laminated underneath second layer 22.

Incidentally, one layer or at least two layers which is/are the same layer as first layer 21, the same layer as second layer 22 or the same layer as third layer 23, or which is/are made of resin different from that of first layer 11 or third layers 13 may be laminated underneath third layer 23.

EXAMPLE

Next, the present invention will be explained employing examples, but the present invention is not limited thereto.

(Preparation of Radiation Image Conversion Panel)

Example 1

Preparation of Samples 1–9

A stimulable phosphor (CsBr: 0.0005 Eu) was evaporated onto one surface of a support including an aluminum plate having a thickness of 500 μm to form a stimulable phosphor layer.

The foregoing stimulable phosphor (CsBr: 0.0005 Eu) was charged into a resistance heating crucible as an evaporation material, and the support was set to a rotatable support holder to adjust the spacing between the support and an evaporation source to 500 mm. Subsequently, the inside of the evaporator was evacuated and then, Ar gas was introduced thereto to adjust the vacuum degree to $5.0\times10^{-3}$ Ps; thereafter, A temperature of the support was maintained at 80° C., while rotating the support at 10 rpm.

Subsequently, the resistance heating crucible was heated to evaporate the stimulable phosphor and evaporation was completed when the thickness of the stimulable phosphor layer reached a predetermined thickness.

Immediately after this, a phosphor plate was placed in a conventional thermostatic oven, and heated at 140° C. for 2 hours under gas atmosphere described in following Table 1 (In the case of solid, similarly to the phosphor plate, it is placed within a thermostatic oven employing a heat resistant vessel.). Subsequently, it was heated under reduced pressure $N_2$ gas atmosphere at 140° C. for 2 hours.

After treatment, a CPP layer of the first moisture resistance protective film was placed facing the stimulable phosphor layer of the phosphor plate, the CPP layer of the second moisture resistance protective film was placed facing a support of the phosphor plate, and the first and second moisture resistance protective films were superimposed while standing in that state. Then, peripheral portions of the first and second moisture resistance protective films were fused by an impulse heat sealer, while decompressing the space surrounded by the first and second moisture resistance protective films, and the phosphor plate was sealed in the first and second moisture resistance protective films to prepare a radiation image conversion panel.

<Evaluation>

Samples 1–9 prepared as described above were evaluated with a method described below.

(1) Shell Composition, Core Composition and Total Composition.

A torn surface of a phosphor sample was prepared to expose the side surface of columnar crystals, whereby a shell composition was obtained via an XPS. The conditions employed here are an anode: Mg (600 W), and a "Take off angle" of 90°, using ESCALab200R produced by Thermo VG Scientific. Subsequently, 1 µm etching was conducted from the sample side surface with argon ions, and the XPS measurement was performed again to determine the core composition.

The phosphor sample was also dissolved, and a halogen amount was measured via ion chromatography to determine the total composition.

(2) Layer Thickness

The cross-sectional surface of a sample was prepared to determine a layer thickness via corrections with scanning electron micrographs. In the case of measurements employing a commercially available layer thickness meter such as a dial gauge or an eddy current type layer thickness measurement instrument, employed are the above-described values corrected with scanning electron micrographs.

(3) Eu Content in Stimulable Phosphor Layer

The Eu content in the resulting stimulable phosphor layer was measured as described below.

Two hundred mg was weighed after peeling a phosphor layer. Four mg of a hydrochloric acid solution was added into this to make 20 ml with ultrapure water. The quantitative analysis of Eu was carried out employing an ICP-AES. (A calibration sample was prepared by adding a known amount of Eu into an Eu-free CsBr sample in which the same pre-treatment was conducted as above.) The Eu content of each of samples 1–9 was within the range of 225–230 ppm. In addition, when a stimulable phosphor raw material before evaporation was measured with the same method, it was 350 ppm.

(4) Evaluation of Emission Luminance

Emission luminance was evaluated according to the following procedures.

After Each sample was exposed to X-ray at a tube voltage of 80 kV from the rear surface (the surface on which no stimulable phosphor is formed) of each sample, and the stimulable phosphor layer was excited by scanning a semiconductor laser on the surface (the surface on which a stimulable phosphor is formed) of each sample. The amount of light (light intensity) of stimulated luminescence emitted from the stimulable phosphor layer was captured for each sample via a light receiving device (photomultiplier tube having spectral sensitivity of S-5) to measure the light intensity, and the measured intensity was defined as the sensitivity (emission luminance). The results are shown in Table 1. Note that the values of sensitivity of each sample in Table 1 were described in relative value when the sensitivity of Sample 1 was set to 100.

(5) Sharpness

Sharpness was evaluated according to the following procedures.

Each sample was exposed to X-ray at a tube voltage of 80 kV through an MTF chart made of lead from the rear surface (the surface on which no stimulable phosphor is formed) of each sample, and the stimulable phosphor layer was excited by scanning a semiconductor laser on the surface (the surface on which a stimulable phosphor is formed) of each sample. The amount of light (light intensity) of stimulated luminescence emitted from the stimulable phosphor layer was captured for each sample via a light receiving device (photomultiplier tube having spectral sensitivity of S-5) and converted to electrical signals, and the electrical analogue signals were converted to digital signals which were recorded on a hard disc. The record was analyzed via computer to determine modulation transfer function (MTF) of the X-ray image. The results are shown in Table 1. Note that the values of MTF of each sample in Table 1 were described in relative value when the MTF of Sample 1 was set to 100.

(6) Aging Characteristics (Emission Luminance and Sharpness)

Aging characteristics were evaluated according to the following procedures.

After storing samples completed via evaluation in (3) and (4) in a thermostatic oven at 40° C. and 90% RH for 7 days, the aging characteristic of emission luminance as well as sharpness was evaluated similarly to the procedures of (3) and (4). The results are shown in Table 1.

TABLE 1

| Sample | Phosphor treatment | Core composition | Shell composition | Total composition | Thickness (μm) | Performance at an initial stage Luminance | Performance at an initial stage Sharpness | *1 Luminance | *1 Sharpness | Remarks |
|---|---|---|---|---|---|---|---|---|---|---|
| 1 | Not conducted | CsBr (100) | CsBr (100) | CsBr(100) | 350 | 100 | 100 | 72 | 90 | Comp. |
| 2 | HFE + 1 hr | CsBr (100) | CsBr:CsF (98:2) | 5 ppm of CsF contained in CsBr | 350 | 100 | 105 | 70 | 92 | Inv. |
| 3 | HFE + 4 hr | CsBr (100) | CsBr:CsF (95:5) | 5 ppm of CsF contained in CsBr | 350 | 130 | 115 | 122 | 108 | Inv. |
| 4 | HFE + 4 hr + water | CsBr (100) | CsBr:CsF (30:70) | 5 ppm of CsF contained in CsBr | 350 | 150 | 128 | 143 | 120 | Inv. |
| 5 | HFE + 4 hr + water | CsBr (100) | CsBr:CsF (30:70) | 5 ppm of CsF contained in CsBr | 40 | 55 | 135 | 51 | 134 | Inv. |
| 6 | HFE + 4 hr + water | CsBr (100) | CsBr:CsF (30:70) | 5 ppm of CsF contained in CsBr | 510 | 153 | 120 | 148 | 118 | Inv. |
| 7 | Cl$_2$ gas | CsBr (100) | CsBr:CsCl (10:90) | 5 ppm of CsCl contained in CsBr | 350 | 148 | 123 | 142 | 119 | Inv. |
| 8 | I$_2$ gas | CsBr (100) | CsBr:CsI (10:90) | 5 ppm of CsI contained in CsBr | 350 | 142 | 118 | 138 | 118 | Inv. |
| 9 | CDI | CsBr (100) | CsBr:CsI (10:90) | 5 ppm of CsI contained in CsBr | 350 | 124 | 119 | 122 | 119 | Inv. |

*1: Performance after moisturizing at 23° C. and 80% RH for 6 hours
Comp.: Comparative example, Inv.: Present invention As is clear from Table 1, it is to be understood that samples of the present invention are excellent in comparison to comparative samples.

EFFECT OF THE INVENTION

A radiation image conversion panel has the effect of exhibiting excellent sharpness and graininess, accompanied with high luminance.

What is claimed is:

1. A radiation image conversion panel comprising an alkali metal halide based stimulable phosphor layer formed by a vapor deposition method, provided on a support,
   wherein a stimulable phosphor comprises at least two kinds of halides, and a phosphor columnar crystal in the stimulable phosphor layer has a core/shell structure.

2. The radiation image conversion panel of claim 1,
   wherein a composition ratio of alkali metal halides A to B is in A>B, and a core portion of the phosphor columnar crystal is made of alkali metal halide A and a halogen composition ratio of A to B constituting a shell portion of the phosphor columnar crystal is 95:5–0:100, when the stimulable phosphor comprises alkali metal halide A as a main component and alkali metal halide B as another component.

3. The radiation image conversion panel of claim 1,
   wherein the alkali metal halide based stimulable phosphor layer has a thickness of 50–500 μm.

4. The radiation image conversion panel of claim 1,
   wherein the core portion of the phosphor columnar crystal is made of CsBr:Eu (cesium bromide:europium activator), and the shell portion of the phosphor columnar crystal is made of CsF:Eu (cesium fluoride:europium activator) and CsBr:Eu (cesium bromide:europium activator).

5. The radiation image conversion panel of claim 1,
   wherein the core portion of the phosphor columnar crystal is made of CsBr:Eu (cesium bromide:europium activator), and the shell portion of the phosphor columnar crystal is made of CsCl:Eu (cesium chloride:europium activator) and CsBr:Eu (cesium bromide:europium activator).

6. The radiation image conversion panel of claim 1,
   wherein the core portion of the phosphor columnar crystal is made of CsBr:Eu (cesium bromide:europium activator), and the shell portion of the phosphor columnar crystal is made of CsI:Eu (cesium iodine:europium activator) and CsBr:Eu (cesium bromide:europium activator).

7. The radiation image conversion panel of claim 1,
   wherein a moisture content of the stimulable phosphor layer, after letting the radiation image conversion panel comprising the alkali metal halide based stimulable phosphor layer formed on a support by the vapor deposition method stand at 23° C. and 80% RH for 6 hours, is 1–50 ppm.

* * * * *